US008838763B2

(12) United States Patent
Grohman

(10) Patent No.: US 8,838,763 B2
(45) Date of Patent: Sep. 16, 2014

(54) COMMUNICATIONS SYSTEM, A HVAC SYSTEM EMPLOYING THE SAME AND A METHOD OF MANUFACTURING A COMPONENT FOR THE HVAC SYSTEM

(75) Inventor: Wojciech Grohman, Little Elm, TX (US)

(73) Assignee: Lennox Industries Inc., Richardson, TX (US)

( * ) Notice: Subject to any disclaimer, the term of this patent is extended or adjusted under 35 U.S.C. 154(b) by 205 days.

(21) Appl. No.: 12/969,758

(22) Filed: Dec. 16, 2010

(65) Prior Publication Data

US 2012/0158932 A1 Jun. 21, 2012

(51) Int. Cl.
*H03H 7/38* (2006.01)
*H04L 12/40* (2006.01)
*G06F 15/173* (2006.01)
*H04L 12/28* (2006.01)
*F24F 11/00* (2006.01)

(52) U.S. Cl.
CPC ......... *H04L 12/2838* (2013.01); *H04L 12/2803* (2013.01); *F24F 2011/0061* (2013.01)
USPC .............. 709/223; 333/32; 333/124; 370/438

(58) Field of Classification Search
USPC ....................... 709/232; 370/438; 333/32, 124
See application file for complete search history.

(56) References Cited

U.S. PATENT DOCUMENTS

| 5,734,658 A * | 3/1998 | Rall et al. ...................... 370/438 |
| 2007/0012052 A1* | 1/2007 | Butler et al. .................... 62/181 |
| 2007/0262788 A1* | 11/2007 | Sanji et al. ...................... 326/30 |
| 2010/0109850 A1* | 5/2010 | Kovach et al. ............. 340/10.32 |

OTHER PUBLICATIONS

AN00020, TJA1050 high speed CAN transceiver, Nov. 2006, NXP, Rev. 02.*
Maxim, Guidelines for Proper Wiring of an RS-485 (TIA/EIA-485-A) Network; Jul. 12, 2001; 12 pages.

* cited by examiner

*Primary Examiner* — Hoon J Chung
*Assistant Examiner* — Yaotang Wang

(57) ABSTRACT

A communications network, a HVAC system employing a communications system and a method of manufacturing a component for the HVAC system are disclosed. In one embodiment, the communications network includes: (1) a dominant node having a predetermined coupling impedance and (2) a plurality of end nodes coupled to the dominant node, each of the plurality having an end node coupling impedance, wherein a total of each the end node coupling impedance and the predetermined coupling impedance is substantially a defined maximum loading impedance for the communication network.

16 Claims, 3 Drawing Sheets

COMMUNICATIONS SYSTEM, A HVAC SYSTEM EMPLOYING THE SAME AND A METHOD OF MANUFACTURING A COMPONENT FOR THE HVAC SYSTEM

TECHNICAL FIELD

This application is directed, in general, to communications networks and, more specifically, to a type of communications network employable with Heating, Ventilating and Air Conditioning (HVAC) systems.

BACKGROUND

A concern with networks is preserving the quality of signals transmitted between the various components connected thereto. One way to preserve signal quality is to match impedance at the source of a signal on the network and at the destination of the signal on the network. Impedance matching, however, can be difficult in multi-node networks having a distributed architecture connecting multiple components.

Communications networks for HVAC systems provide an example of such networks that connect multiple components together and provide communication paths between the multiple components for the exchange of data. In addition to the difficulty of a multi-node network, the configuration of communications networks for HVAC systems can greatly vary depending on the installations. As such, the distances and the topology of connection between the various components connected to the communications network can vary between installations. Therefore, impedance associated with the interconnections of the communications network can also vary between different installations of the same type of HVAC system. Furthermore, the interconnections used in HVAC communications networks, (e.g., copper wire) may not be manufactured at a high standard for impedance matching. Accordingly, the impedance characteristics of a communications network itself may vary even if interconnecting distances and the topology are the same. To compensate for these impedance differences, manual adjustments may be needed in the field. For example, service or installation technicians may have to adjust dual in-line package (DIP) switches on the different components at the various nodes of the communications network. This may result in errors when transmitting data via the communications network. Thus, maintaining signal quality on these types of communications networks, such as those of HVAC systems, can be a challenge.

SUMMARY

One aspect provides a communications network. In one embodiment, the communications network includes: (1) a dominant node having a predetermined coupling impedance and (2) a plurality of end nodes coupled to the dominant node, each of the plurality having an end node coupling impedance, wherein a total of each the end node coupling impedance and the predetermined coupling impedance is substantially a defined maximum loading impedance for the communication network.

In another aspect, the disclosure provides an HVAC system. In one embodiment, the HVAC system includes: (1) an air handler configured to condition and circulate air for the HVAC system and (2) an air handler controller for the HVAC system configured to control operation of the air handler, the air handler controller including interface circuitry having a predetermined coupling impedance and configured to couple the air handler controller to components of the HVAC system via a communications network of the HVAC system, wherein a total of the predetermined coupling impedance and an end node coupling impedance at each of the components is substantially a defined maximum loading impedance for the communications network.

In yet another embodiment, the disclosure provides a method of manufacturing a component for a HVAC system. In one embodiment, the method includes: (1) obtaining an end node coupling impedance for a component of the HVAC system and (2) providing the component having the end node coupling impedance.

BRIEF DESCRIPTION

Reference is now made to the following descriptions taken in conjunction with the accompanying drawings, in which.

DETAILED DESCRIPTION

Disclosed herein is a communications network that is designed to provide a universal plug and play termination scheme that preserves the quality of signals transmitted across the network. As such, technicians do not have to be relied on to provide matching impedances for communications networks. Instead, the disclosure provides a physical network with designed coupling impedances at each node of the network to preserve signal quality. Accordingly, components can be manufactured having these designed (or defined) coupling impedances to provide a plug and play solution. For example, the coupling impedances may be embedded in electronic controllers at each node of the communications networks. The controllers may be computing devices designed to direct the operation of a particular component at each node. Interface circuitry of the controllers may include the coupling impedance at a node of the communications networks. The interface circuitry may include a transceiver of the electronic controllers and a physical interface circuitry for the transceiver.

In addition to providing signal stability, the disclosed network is designed to satisfy free network topologies. In some embodiments, the provided communication network can have a star topology. The communications network may have multiple nodes and can couple a maximum of thirty two components together. Of course, the network may be used to couple fewer than thirty two components.

The communications length between the multiple nodes of the disclosed communications network can vary without affecting the signal quality. As such, the disclosed network can be used for HVAC systems that have various configurations due to installation sites. Accordingly, the disclosed communications network can compensate for variable communication lengths between the coupled components. Additionally, the disclosed communications network can compensate for different wire sizes used for interconnecting nodes of the network. As such, the provided communications network is wire size-agnostic.

Figure 1:
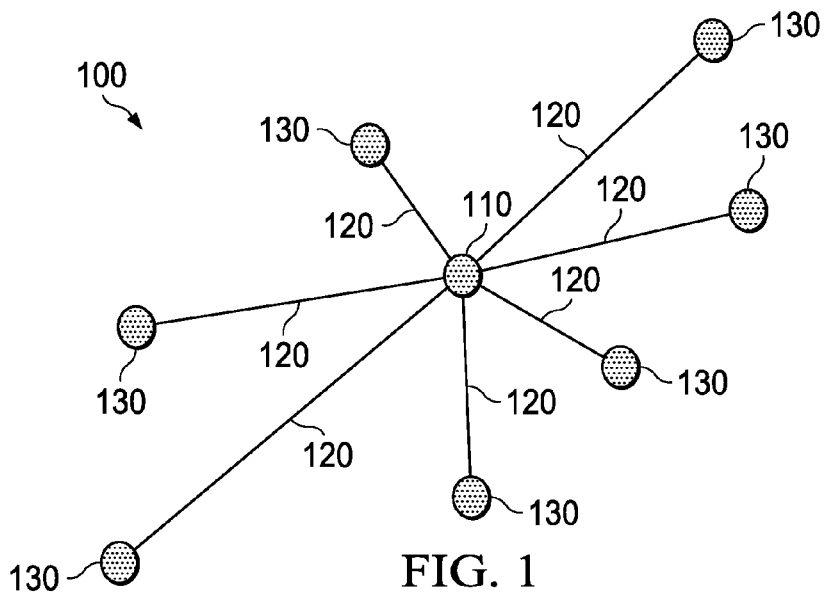
FIG. 1 illustrates a network topology diagram of an embodiment of a parallel impedance matching (PIM) network constructed according to the principles of the disclosure.

FIG. 1 illustrates a network topology diagram of an embodiment of a parallel impedance matching (PIM) network 100 constructed according to the principles of the disclosure. The network topology diagram provides a layout of interconnections of the various elements (e.g., nodes) of the PIM network 100. The PIM network 100 may be a communications network within a structure. For example, the PIM network 100 may be a building communications network that is located therein and provides a medium for communications within the building between coupled components of the communications network.

The PIM network 100 includes a dominant node 110, interconnections 120 and a plurality of end nodes 130. In one embodiment, the PIM network 100 may be a communications network for an HVAC system. As such, the dominant node 110 and the plurality of end nodes 130 may be at components of the HVAC system. Each of the nodes, the dominant node 110 and each of the plurality of end nodes 130, includes a transceiver circuit having a differential input impedance. More specifically, the circuit's differential input impedance is a combination of the circuit's transceiver differential input impedance and the impedance of the terminating and protection elements of the circuit. In one embodiment, the dominant node 110 and the plurality of end nodes 130 may be electronic controllers of each component at the particular nodes. As such, the transceiver circuit of each node may be the transceiver circuit of the electronic controllers.

The dominant node 110 is coupled to each of the plurality of end nodes 130 by one of the interconnections 120 to form a physical network topology. The interconnections 120 provide a differential communication bus between nodes of the PIM network 100. The dominant node has usually the highest number of interconnections 120 connected to it. As illustrated in FIG. 1, a length of each of the interconnections 120 may vary. In one embodiment, the interconnections 120 may be copper wire. For example, the interconnections 120 may be 18, 20 or 22 American Wire Gauge (AWG) copper wire. The PIM network 100 may have a physical topology of a star. In one embodiment, the dominant node 100 and the plurality of end nodes 130 are coupled together in a free-topology network. Free-topology network is a network where each device is tied to the network at one point only with only a single physical path of communication to any other device in the network. This thus includes star topologies, tree topologies, bus topologies (defined in classical sense as a continuous trunk of communication medium with two ends, having multiple short stubs attached to the trunk), but excludes ring or fully connected mesh topologies. In the PIM network 100, each of the plurality of end nodes 130 are coupled together in parallel with the dominant node 110 to form a DC (direct current) load of the network.

The dominant node 110 is established as a control node for the PIM network 100 and has a predetermined coupling impedance. The dominant node 110 circuit's differential input impedance is the predetermined coupling impedance for the node. Similarly, the end node 130 circuit's differential input impedance is the predetermined coupling impedance for that node, referred to as an end node coupling impedance. In one embodiment, each of the end node coupling impedances are embedded in an electronic controller at each of the plurality of end nodes. In some embodiments, at least one of the end node coupling impedances are embedded in an electronic controller at one of the plurality of end nodes. The predetermined coupling impedance may also be embedded in an electronic controller at the dominant node 110. In one embodiment, the predetermined coupling impedance has a resistance within a range of 50 ohms to 200 ohms. The predetermined coupling impedance can allow various wire sizes to be used for the interconnections 120. As such, the communications network 100 is a wire size-agnostic network.

The PIM network 100 has a defined maximum loading impedance. In one embodiment, the defined maximum loading impedance is based on a characteristic of a transceiver at the dominant node 110. The characteristic may be an operating parameter of the transceiver. The characteristic may be a current limit, a voltage limit, a capacitance limit or a DC load limit for the transceiver. The transceiver may be a Bosch Controller Area Network (CAN) compliant transceiver. The CAN transceiver may comply with various CAN specifications, including revision 2 or ISO-11898. In another embodiment, the transceiver may be a RS-485 compliant transceiver. The RS-485 transceiver may comply with various versions of transceivers for a RS-485 network. The specifications and applications notes from the manufacturers of a particular transceiver can provide the maximum loading resistance of a network that the transceiver can drive. Additionally, the manufacturer information can also provide the differential input impedance for the transceiver circuits of transceivers. For example, CAN transceiver TJA1050 can drive a resistive load of up to 45 Ohm, as defined by the manufacturer. As such, in some embodiments the defined maximum loading impedance for the PIM network 100 may be based on the characteristics of a RS-485 compliant receiver or the characteristics of a CAN compliant receiver.

The PIM network 100 is designed wherein a total of each of the end node coupling impedances and the predetermined coupling impedance, which include the differential input impedances of each node's respective transceiver circuit, is (or substantially is) a defined maximum loading impedance for the communication network 100. Specific calculations are carried out for each one of the maximum number of nodes of the PIM network 100 in transmit mode and all of the remaining nodes of the PIM network 100 in receive mode. The design of the PIM network 100, including the predetermined impedance and the end node coupling impedances, is then based on the results of all of these calculations. As such, the PIM network 100 is configured to have specific impedances between the coupling of the interconnections 120 at the dominant node 110 and all of the couplings of the interconnections 120 at the plurality of end nodes 130. Thus, the predetermined coupling impedance and resulting end node coupling impedances may be determined from simulations having multiple variables based on different type (i.e., different gauges) of interconnections 120, different type of transceivers at each of the nodes, operating speeds, etc. With matching impedances, the PIM network 100 preserves the quality of signals traversing thereon and prohibits (or at least substantially reduces) reflections at the connections of the interconnections 120 with the dominant node 110 and the plurality of end nodes 130. The end node coupling impedances may be the same for each of the plurality of end nodes 130. In other embodiments, the end node coupling impedances may vary for the different ones of the plurality of end nodes 130. As such, in some embodiments, each end node coupling impedance is substantially the same. In other embodiments, at least two of the end node coupling impedances are not substantially the same.

Turning now to an example, as noted above, in one embodiment the PIM network 100 is configured wherein the plurality of end nodes 130 is coupled together in parallel with the dominant node 110. A defined maximum loading impedance for the PIM network 100 may be determined to be 45 ohms based on at least one characteristic of a transceiver at the dominant node 110. Through extensive simulations, the predetermined coupling impedance can be determined to be 50 ohms. The total impedance of the end node coupling impedances ($ENCI_{TOT}$) is then 450 ohms (i.e., 45 ohms=(50 ohms× $ENCI_{TOT}$)/(50 ohms+$ENCI_{TOT}$)). This means that all end node impedances of the plurality of end nodes 130 which includes all minimum differential impedances (as seen from the communication lines, i.e., the interconnections 120) of each end node's respective transceiver circuit should not be less than 450 ohms.

In one embodiment, each end node coupling impedance may be substantially the same. In other embodiments, each end node coupling impedance may not be substantially the same. Continuing with the example, the PIM network 100 includes seven end nodes 130. For example, if the end node coupling impedances are the same, and the CAN TJA1050 transceiver is used with its minimum differential input impedance of 25 kohm, then each of the plurality of end nodes 130 would have an end node coupling impedance of approximately 64.28571 ohms (i.e., 450 ohms divided by 7 in parallel with 25 kohm). A terminating resistance at the end node may be adjusted and used with the differential input impedance of 25 kohms to provide the end node coupling impedance of approximately 64.28571 ohms. In this example, a terminating resistance of 64.4514 ohms may be used. Additionally, end node coupling impedances may not be equally divided. As such, five end nodes may have use a terminating resistance of 90.32 ohms each and two end nodes use a terminating resistance of 227.04 ohms each to reach a total of 450 ohms including the 25 kohm differential input impedances of the transceiver circuit.

Figure 2:
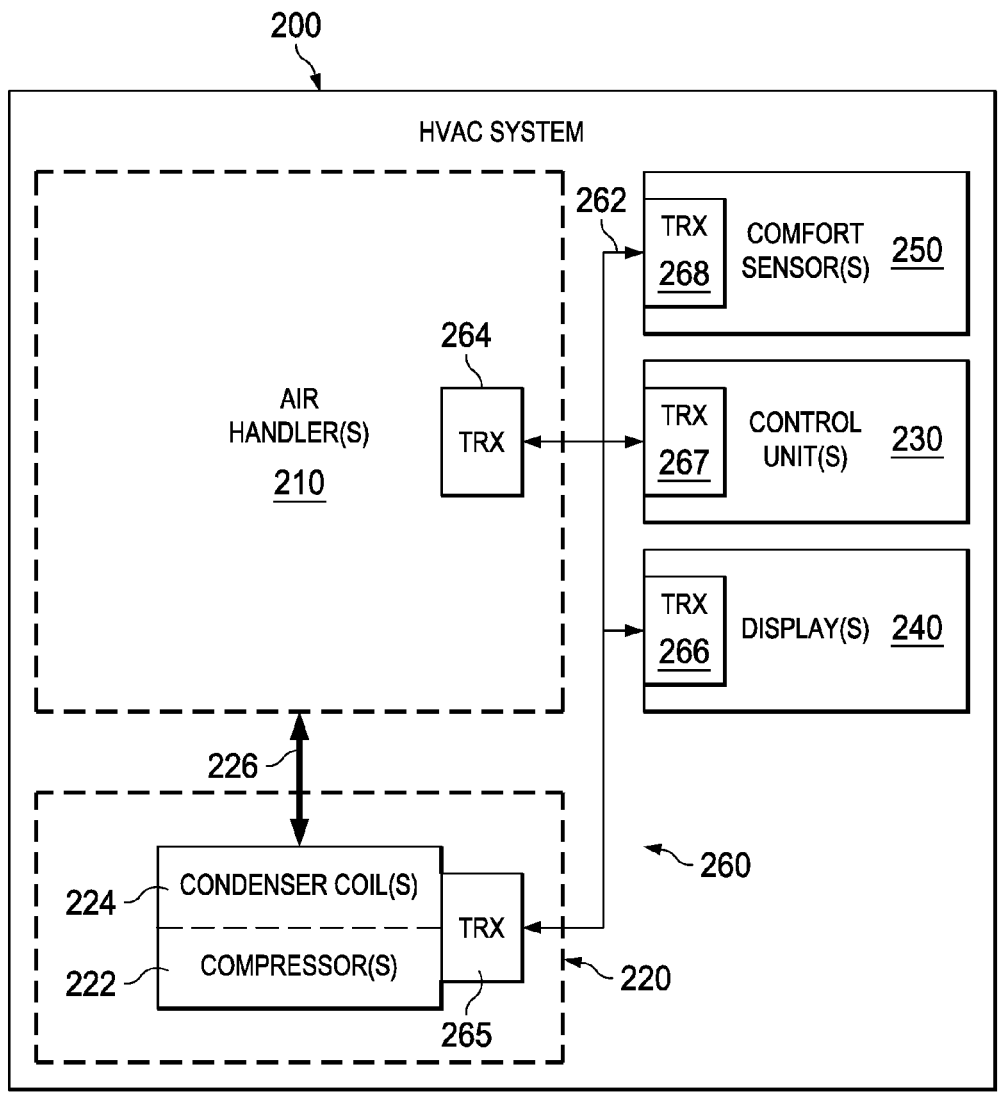
FIG. 2 illustrates a high-level block diagram of an embodiment of a HVAC system constructed according to the principles of the disclosure.

FIG. 2 illustrates a high-level block diagram of an HVAC system 200 constructed according to the principles of the disclosure. The HVAC system 200 includes a communications network as discussed with respect to FIG. 1. As such, the HVAC system 200 includes a communications network 260 that couples together the various components of the HVAC system 200.

The HVAC system 200 includes an air handler 210 that is configured to condition and circulate air for the HVAC system 200. The air handler 210 may include heating and/or cooling elements to condition air and a blower to move the air through the HVAC system 200 and into an enclosure. As such, the air handler 210 may include a furnace and or evaporator coils. Additionally, the air handler 210 may be associated with an outdoor unit 220. Typically, the air handler 210 is an indoor unit. The outdoor unit 220 may include a compressor 222 and associated condenser coils 224 that are typically connected to an associated evaporator coil in the air handler 210 by a refrigerant line 226. One skilled in the art will understand that the HVAC system 200 may include multiple air handlers and, therefore, include multiple associated components as indicated in FIG. 2. Descriptions of FIG. 2, however, will only refer to one of the components. Additionally, one skilled in the art will understand that the HVAC system 200 may include additional components, such as dampers, a thermostat, etc., that are not illustrated or discussed but are typically included in an HVAC system.

A control unit 230 controls the air handler 210 and/or the compressors 222 to regulate the temperature of the premises. The display 240 can provide additional functions such as operational, diagnostic and status message displays and a visual interface that allows a technician to perform actions with respect to the HVAC system 200 more intuitively.

A comfort sensor 250 may be associated with the display 240 and may also optionally be associated with the control unit 230. The comfort sensor 250 provides environmental data, e.g. temperature and/or humidity, to the control unit 230. The comfort sensor 250 may be physically located within a same enclosure or housing as the control unit 230, in a manner analogous with a conventional HVAC thermostat. In that case, the comfort sensor 250 and the control unit 230 may share the same transceiver circuit. In other embodiments, the comfort sensor 250 may be located separately and physically remote from the control unit 230.

The HVAC system 200 also includes the communications network 260 that is configured to provide a communication medium between or among the aforementioned components of the HVAC system 200. Accordingly, the communications network 260 couples the air handler 210, the outdoor unit 220, the control unit 230, the display 240 and the remote comfort sensor 250 such that data may be communicated therebetween or thereamong. The data may be control data. Additionally, the communications network 260 may be advantageously employed to convey one or more alarm messages or one or more diagnostic messages. Each of the components of the HVAC system 200 includes a transceiver that is configured to communicate (transmit and receive) data over the communications network 260. That transceiver, together with other associated components comprises the transceiver circuit.

The communications network 260 includes interconnections 262 and the various transceiver circuits 264, 265, 266, 267 and 268. The communications network 260 is a PIM network as discussed with respect to FIG. 1. One of the components, or more specifically, one of the transceiver circuits thereof, may be designated as the dominant node. For example, the transceiver circuit 264 may be designated as the dominant node. The other transceiver circuits 265, 266, 267 and 268, therefore, are end nodes.

Figure 3:
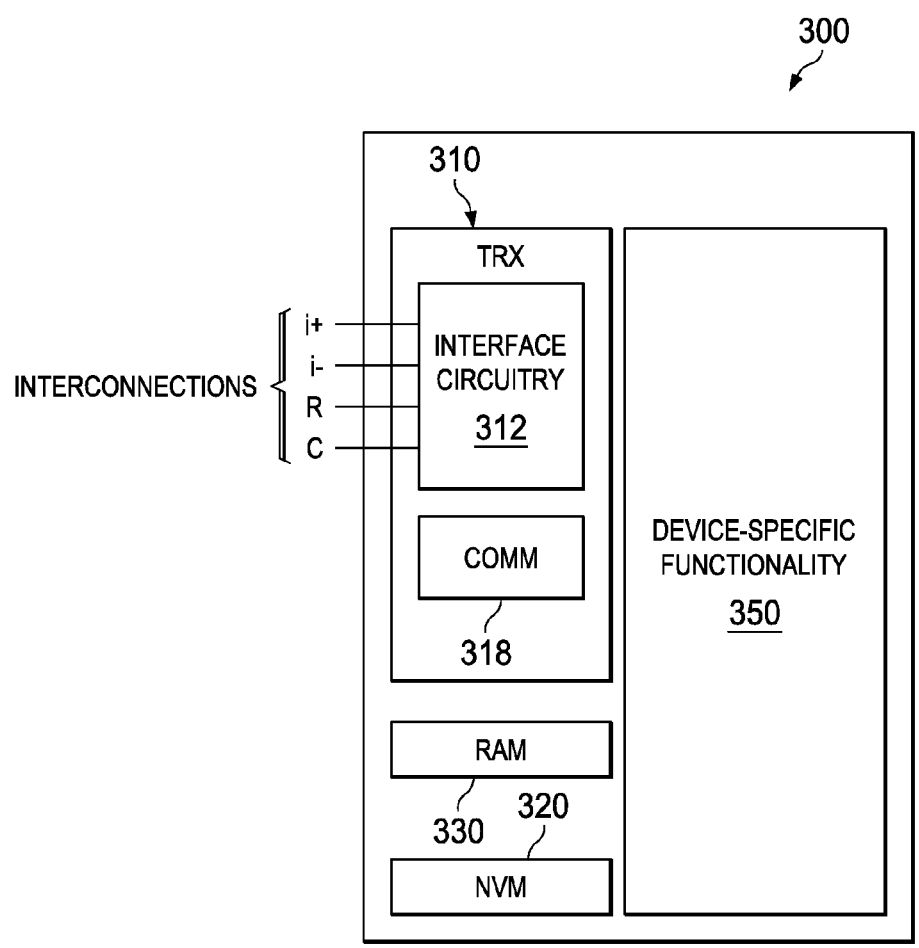
FIG. 3 illustrates a high-level block diagram of an embodiment of an electronic controller constructed according to the principles of the disclosure.

At least some of the transceiver circuits of the communications network 260 may be part of a local controller (not illustrated) for each particular component. Local controllers are electronic controllers that may be configured to provide a physical interface for the communications network 260 and provide various functions related to network communication. A representative controller for each component of the HVAC system 200 is illustrated in FIG. 3. The controller 230 may be regarded as a special case of an electronic controller, in which the controller 230 has additional functionality enabling it to control operation of the various networked components, to manage aspects of communication among the networked components, or to arbitrate conflicting requests for network services among these components.

FIG. 3 illustrates a high-level block diagram of an embodiment of an electronic controller 300 constructed according to the principles of the disclosure. The electronic controller 300 includes a transceiver circuit 310, a non-volatile memory (NVM) 320, a RAM 330 and a functional block 350 that may be specific to a component with which the electronic controller 300 is associated. The transceiver circuit 310 includes interface circuitry 312 and a communication module 318.

The interface circuitry 312 provides an interface between interconnections of a communication network (e.g., the communications network 260 and the interconnections 262) and the remaining components of the electronic controller 300. The interface circuitry 312 may include a physical layer interface (PLI) and a transceiver. The PLI may include protection circuitry, logic circuitry, power circuitry and other components or circuits to assist the transceiver in communicating over the communications network. The PLI may include a terminating resistance that can be adjusted to provide a desired end node coupling impedance or a predetermined coupling impedance. In some embodiments, the communications network may be implemented with interconnections over a 4-wire cable, in which the individual conductors are assigned as follows:

R—the "hot"—a voltage source, 24 VAC, e.g.
C—the "common"—a return to the voltage source.
i+—RSBus High connection.
i−—RSBus Low connection.

The C line may be locally grounded and a 24 VAC transformer associated with a component coupled to the communications network may provide power to other components coupled thereto via the R and C lines. The 4-wire cable may be copper wire. A transceiver may include multiple connectors for connecting to the communications network. 4-wire interconnections, however, are not required. In other embodiments, the communications network may be implemented with different interconnections that provide a differential communication bus but is not 4-wire cable. For example, the C and R connections may not be included and 2 or 3 wire interconnections may be used.

The communications network associated with the controller 300 may be configured as a star network with a furnace transceiver circuit as the dominant node. Thus, the furnace may include three separate connectors configured to accept a connection to the communications network. Two connectors may be 4-pin connectors: one 4-pin connector may be dedicated for connecting to an outdoor unit, and one may be used to connect to equipment other than the outdoor unit. The third connector may be a 2-pin connector configured to connect to another component or network via the i+/i− signals.

The communication module 318 is configured to broadcast and receive messages over the communication network via the transceiver of the interface circuitry 312. The functional block 350 may include one or more of various components, including without limitation a microprocessor, a state machine, volatile and nonvolatile memory, a power transistor, a monochrome or color display, a touch panel, a button, a keypad and a backup battery. The electronic controller 300 may be associated with a particular component of a system, such as the HVAC system 200, and may provide control thereof via the functional block 350. The NVM 320 provides local persistent storage of certain data, such as various configuration parameters. The RAM 330 may provide local storage of values that do not need to be retained when the electronic controller 300 is disconnected from power, such as results from calculations performed by control algorithms.

With respect to the PIM network 100 and the communications network 260, the controller 300 may be considered a node and include the appropriate coupling impedance for the network. In one embodiment, the interface circuitry 312 of the transceiver circuit 310 may include a predetermined coupling impedance or an end node coupling impedance depending on the use of the controller 300 within the network.

Figure 4:
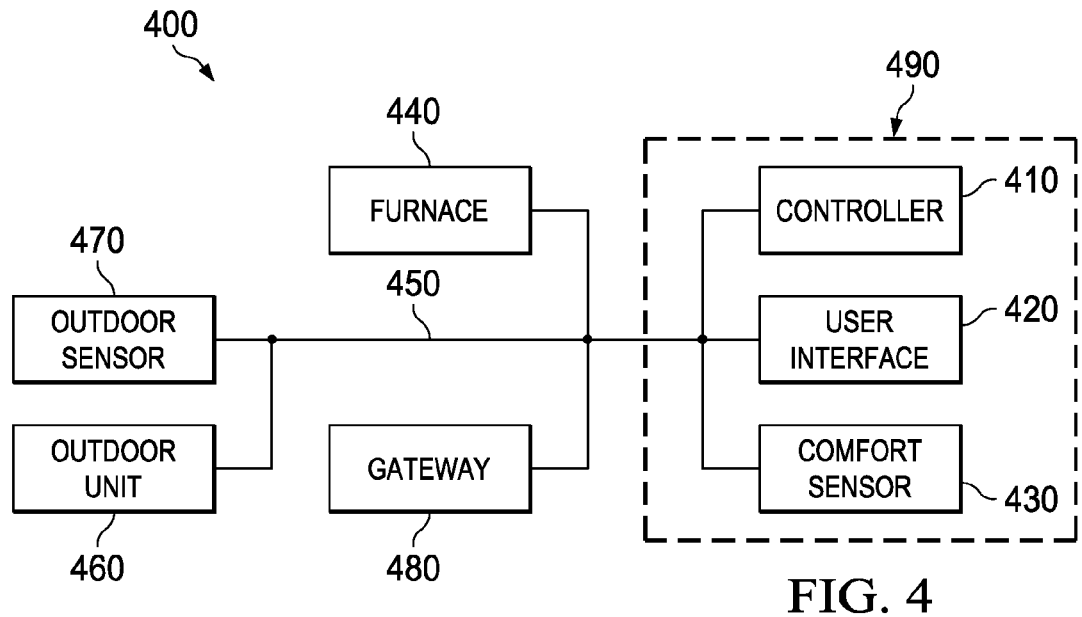
FIG. 4 illustrates a high-level block diagram of an embodiment of a HVAC communications network constructed according to the principles of the disclosure.

FIG. 4 illustrates a high-level block diagram of an embodiment of a HVAC communications network 400 constructed according to the principles of the disclosure. The network 400 includes multiple nodes coupled together via interconnections 450. The interconnections may be copper wire. For example, the interconnections 450 may be a 4-wire cable as discussed above with respect to FIG. 3. The nodes of the communications network 400 may be controllers (not illustrated) of the various illustrated components. The controllers may include transceiver circuits to direct communications via the communications network 400 and provide terminations for the interconnections 450. One of the components, or a controller thereof, may be designated a dominant node wherein the remaining components are end nodes. The components include a controller 410, a user interface 420, a comfort sensor 430 and a furnace 440 configured to communicate over the interconnections 450. In some embodiments these devices form a minimum HVAC network. In addition, the network 400 is illustrated as connecting an outdoor unit 460, an outdoor sensor 470, and a gateway 480. The transceiver of each of these components may be coupled to the interconnections 450 to form the communications network 400.

The controller 410 is configured to control the furnace 440 and the outdoor unit 460 using, such as command messages sent via the interconnections 450. The controller 410 receives environmental data, including temperature and/or humidity, from the comfort sensor 430, the furnace 440, the outdoor sensor 470 and the outdoor unit 460. The data may be transmitted over the communications network 400 by way of messages formatted for this purpose. The user interface 420 may include a display and input means to communicate information to, and accept input from, an operator or manager of the network 400. The display and input means may be a touch-sensitive display screen.

The controller 410, comfort sensor 430 and user interface 420 may optionally be physically located within a control unit 490. The control unit 490 provides a convenient terminal to the operator to effect operator control of the system 100. In this sense, the control unit is similar to the thermostat used in conventional HVAC systems. However, the control unit 490 may only include the user interface 420, with the controller 410 and comfort sensor 430 remotely located from the control unit 490.

The controller 410 may control HVAC functionality, store configurations, and assign addresses during system auto configuration. The user interface 420 provides a communication interface to provide information to and receive commands from a user. The comfort sensor 430 may measure one or more environmental attributes that affect user comfort, e.g., ambient temperature, RH and pressure. The three logical devices 410, 420, 430 each send and receive messages over the communications network 400 to other devices attached thereto, and have their own addresses on the network 400.

Figure 5:
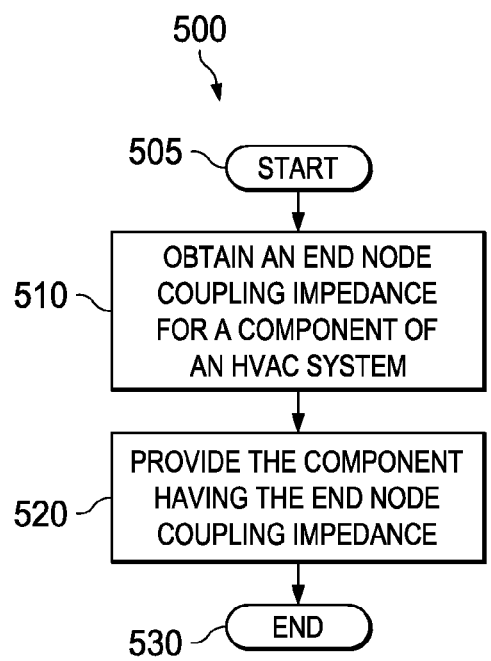
FIG. 5 illustrates a flow diagram of an embodiment of a method of manufacturing a component for an HVAC system carried out according to the principles of the disclosure.

FIG. 5 illustrates a flow diagram of a method of manufacturing a component for an HVAC system carried out according to the principles of the disclosure. The component may include a controller to direct the operation of the component. In other embodiments, the component itself may be a controller for the HVAC system. The controller may include a transceiver circuit for coupling the component to a communications network of the HVAC system. The method begins in a step 505.

In a step 510, an end node coupling impedance for a component of the HVAC system is obtained. The component is intended to be coupled to a communications network of the HVAC system. The end node coupling impedance may be obtained based on defined maximum loading impedance for the communications network and a predetermined coupling impedance for a dominant node of the communications network. The end node coupling impedance may be provided by a manufacturer of the HVAC system to third party vendors for manufacturing the component.

In a step 520, the component is provided with the end node coupling impedance. As such, a technician in the field does not need to be relied on to obtain the proper impedance when servicing or replacing components of the HVAC system. Instead, the component can be coupled to the communications network to provide a plug and play scheme for the HVAC system. The component may be provided by a manufacturer who constructs the component with the end node coupling impedance. In one embodiment, a transceiver circuit of the component may include the end node coupling impedance. For example, interface circuitry of the transceiver circuit, such as a PLI of the interface circuitry, may be manufactured with the end node coupling impedance. The interface circuitry is used to connect the component to the communications network of the HVAC system. The interface circuitry may include terminals or other types of connectors that are used to terminate a conductor. The interface circuitry may be provided during manufacturing of the component. The method 500 ends in a step 530.

Those skilled in the art to which this application relates will appreciate that other and further additions, deletions, substitutions and modifications may be made to the described embodiments.

What is claimed is:

1. A communication network, comprising:
   a dominant node having a predetermined coupling impedance;
   a plurality of end nodes coupled to said dominant node, each of said plurality having an end node coupling impedance, wherein a total of each said end node coupling impedance and said predetermined coupling impedance is a defined maximum loading impedance for said communication network;
   wherein an end node coupling impedance of one of said plurality of end nodes is determined based on said predetermined coupling impedance and end node coupling impedances of remaining ones of said plurality of end nodes.

2. The communication network as recited in claim 1 wherein said defined maximum loading impedance is determined based on a characteristic of a transceiver at said dominant node.

3. The communication network as recited in claim 2 wherein said transceiver is a CAN compliant transceiver.

4. The communication network as recited in claim 2 wherein said transceiver is a RS-485 compliant transceiver.

5. The communication network as recited in claim 1 wherein said predetermined coupling impedance has a resistance within a range of 50 ohms to 200 ohms.

6. The communication network as recited in claim 1 wherein said plurality of end nodes is coupled to said dominant node via copper wire.

7. The communication network as recited in claim 1 wherein a maximum number of said plurality of end nodes is in a range of one to thirty-one.

8. The communication network as recited in claim 1 wherein each said end node coupling impedance is the same.

9. The communication network as recited in claim 1 wherein at least two of said end node coupling impedances are not the same.

10. The communication network as recited in claim 1 wherein communication lengths between said plurality of end nodes and said dominant node vary.

11. The communication network as recited in claim 1 wherein said dominant node and said plurality of end nodes are coupled together in a free-topology network.

12. The communication network as recited in claim 1 wherein said plurality of end nodes are coupled together in parallel.

13. The communication network as recited in claim 1 wherein said communicating network is a building communication network.

14. The communication network as recited in claim 1 wherein said communicating network is a HVAC communications and control network and said dominant node and said plurality of end nodes are HVAC components.

15. The communication network as recited in claim 1 wherein said predetermined coupling impedance is embedded in an electronic controller.

16. The communication network as recited in claim 1 wherein at least one of said end node coupling impedances is embedded in an electronic controller.

* * * * *